Oct. 22, 1968  A. A. ANDERSEN  3,406,463
GRAIN DRIER
Filed Aug. 5, 1966  3 Sheets-Sheet 1
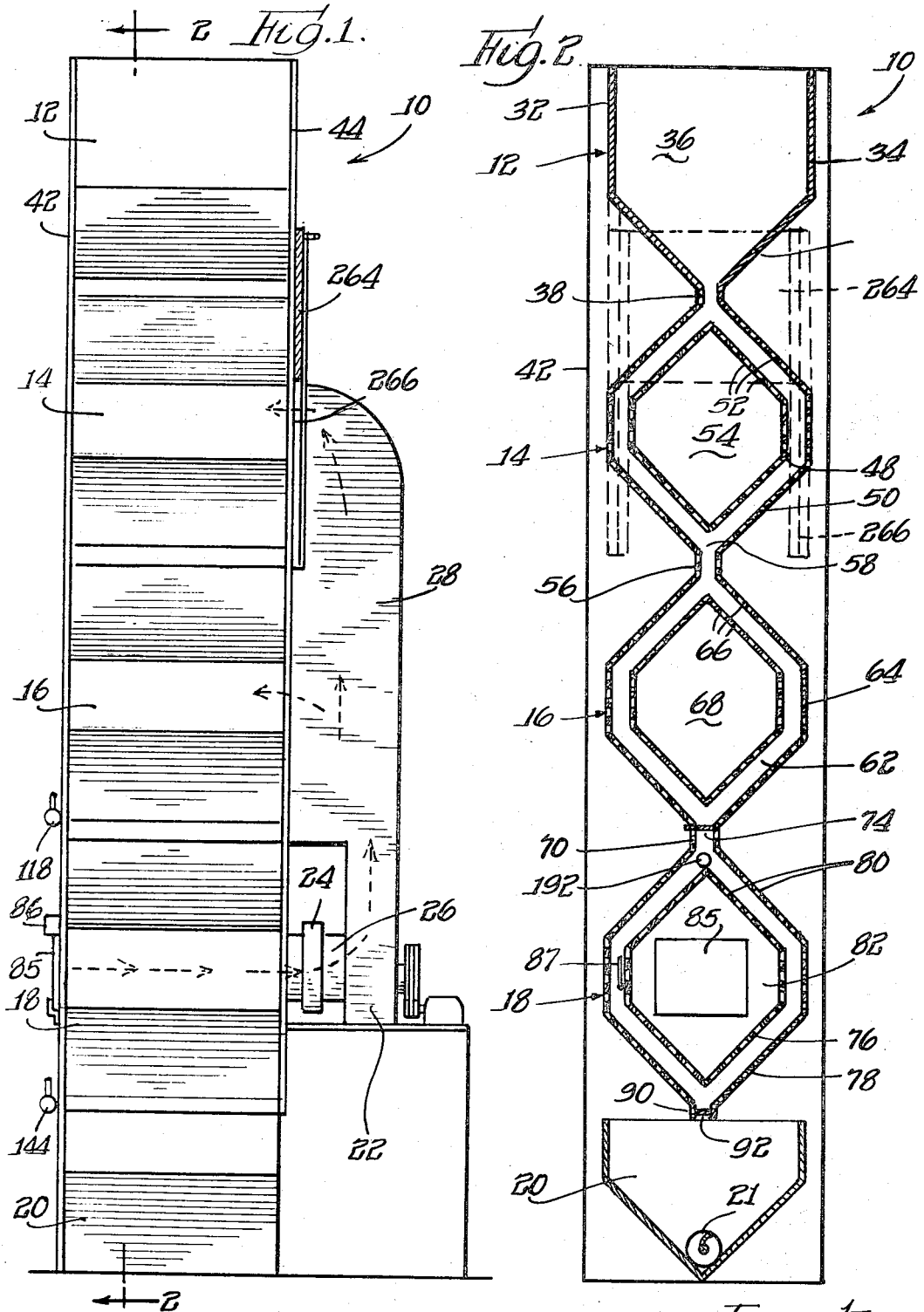
Inventor
Arthur A. Andersen
By: Olson, Trexler, Wolters & Bushnell attys.

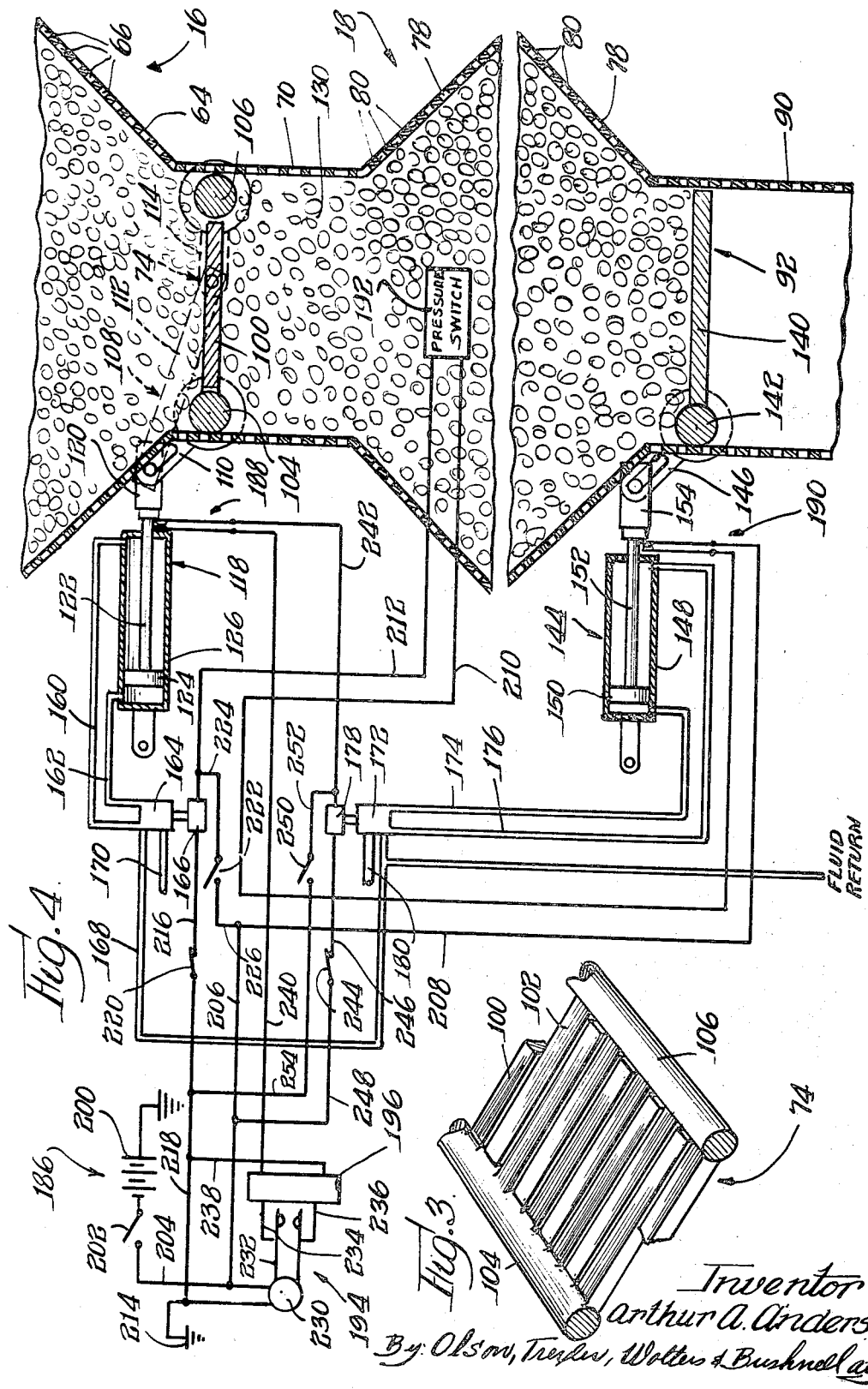

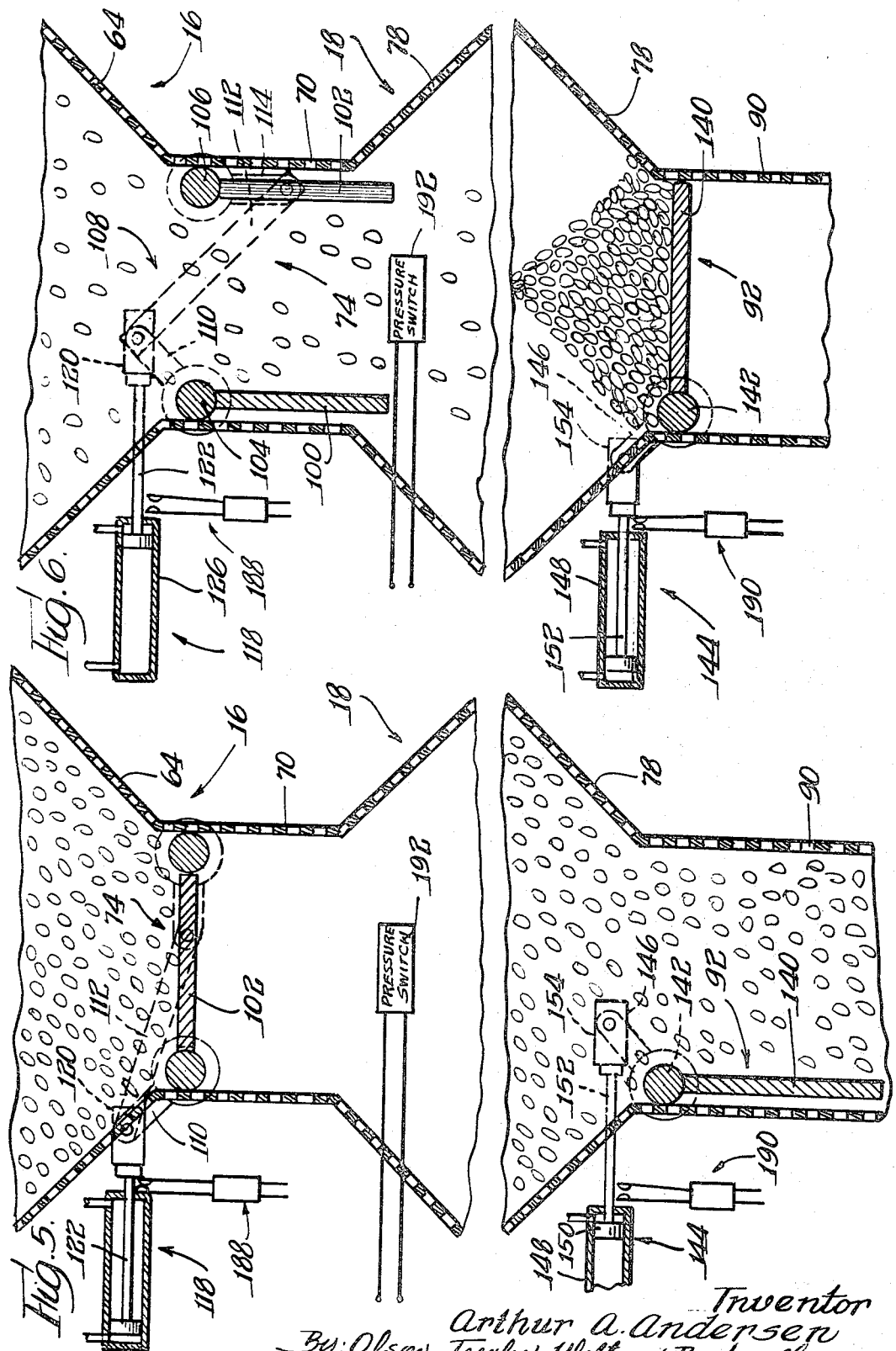

3,406,463
GRAIN DRIER
Arthur Arnold Andersen, Box 247, Pine Crest,
Republic, Mich. 49879
Filed Aug. 5, 1966, Ser. No. 570,553
12 Claims. (Cl. 34—56)

ABSTRACT OF THE DISCLOSURE

This invention relates generally to a drier and more particularly to a drier structure for automatically drying grain according to a predetermined method. The apparatus disclosed in this application contemplates the delivery of moisture laden grain to an upper drying chamber into which preheated air is passed, and a second adjacent lower drying chamber for receiving grain from the upper chamber in timed sequence with respect to discharge of dried grain from said second chamber to a third cooling chamber. Air drawn through this cooling chamber absorbs any residual heat which may be released by the grain, and means is provided for directing air from said cooling chamber to the upper chambers after passing said air through a heating unit, the entire cycle of grain drying operation being automatically controlled by an electrical circuit and valve arrangement to assure proper sequential movement of predetermined quantities of grain in step by step fashion from one position to another, resulting in the sequential discharge of uniformly dried grain from the cooling chamber.

Disclosure

Grain is commonly dried in large batches by forcing hot dry air through the grain to heat and absorb moisture from the grain. After the grain has been dried, relatively cool air is forced through the grain to cool the grain to a safe temperature for storage. By utilizing the same fan to force both the hot air and the relatively cool air through the grain, prior art structures both dry and cool the grain in a single chamber.

The generally satisfactory service rendered by prior art drier structures is shown by their widespread usage for drying many types of grain. However, when large batches of moist grain are dried in prior art structures, it is difficult to obtain a uniform predetermined low moisture content throughout the batch of grain. This lack of uniformity results from the grain being retained in a fixed position relative to a source of hot dry air which is blown through the grain. The moisture content of the grain against which the air is blown directly onto is often lower than the moisture content of the grain against which the air subsequently impinges.

In addition to the problem of obtaining a uniform predetermined moisture level throughout the dried grain, there is an ever present necessity of increasing the operating efficiency of drier structures by increasing the capacity of the drier structure while reducing the cost of operating the drier. The increased capacity is necessary to enable a given drier structure to dry a larger quantity of grain during the relatively short harvesting season. The reduction of operating costs, both as to operating personnel and the drying and cooling of the grain, is always necessary in order to maximize the efficiency and profits of the grain drying operation.

Therefore, it is an object of this invention to provide a grain drier for uniformly drying large batches of grain at a minimum cost.

Another object of this invention is to provide a grain drier for automatically drying grain in a uniform manner with a minimum of effort on the part of operating personnel.

Another object of this invention is to provide a grain drier having improved heating and cooling efficiency to reduce the cost of drying and cooling the grain for storage.

Another object of this invention is to provide a grain drier in which the grain is intermixed during a drying process to provide a uniform moisture level in the dried grain.

These and other objects and features of the invention will become more apparent upon a reading of the following detailed description taken in connection with the accompanying drawings, wherein:

FIG. 1 is an elevational view illustrating a grain drier forming a preferred embodiment of the invention;

FIG. 2 is a sectional view, taken along the line 2—2 of FIG. 1, illustrating the structure of the grain drier of FIG. 1;

FIG. 3 is an enlarged perspective view of a gate or valve for controlling movement of the grain through the grain drier;

FIG. 4 is an illustration setting forth an enlarged view of the gates for regulating the flow of grain in the drier of FIG. 1 and a schematic drawing of a control circuit for the gates, the gates being shown in a closed position blocking the flow of grain in the drier;

FIG. 5 is an enlarged drawing of the gate structures set forth in FIG. 4 illustrating a first gate in a closed position for blocking the flow of grain and a second gate in an open position enabling grain to flow from a section of the drier; and FIG. 6 is an enlarged drawing illustrating the first gate of FIG. 5 in an open position enabling grain to flow from a first section of the drier to a second section, and illustrating the second gate of FIG. 5 in a closed position blocking the flow of grain from a second section of the drier.

Referring now to the drawings in greater detail, a grain drier 10 is illustrated in FIGS. 1 and 2. The grain drier 10 includes a receiving section or compartment 12 which receives moist grain to be dried. The moist grain is conducted to an initial or pre-heat section or compartment 14 wherein the grain is heated and partially dried during a first phase of a grain drying cycle. The preheated grain is then moved to a second or final heat section or compartment 16 in which the grain is further heated and dried. The heated and dried grain is then moved to a cooling section 18 in which the grain is cooled to a safe storage temperature before being moved into a container or hopper 20. The cool dried grain is carried from the hopper 20 to a suitable storage location by the screw conveyor 21.

The grain is cooled in section 18 by air which is drawn through the grain by a fan or pneumatic structure 22 (see FIG. 1). While the air is passing through the heated grain, the temperature of the air is raised and the temperature of the grain is lowered by heat transfer from the hot dry grain to the air. The fan of pneumatic structure 22 then draws the partially heated air through a heater 24 which is mounted in a duct 26 connected to the cooling section 18. After the air has been heated to a relatively high temperature by the heater 24 it is blown into the two heating compartments 14 and 16 through a duct 28 to heat the grain in the compartments 14 and 16.

As is perhaps best seen in FIG. 2, the receiving section 12 is formed of a first outer wall 32 and a second outer wall 34. The two outer walls 32 and 34 define a grain receiving hopper 36 into which moist grain is placed. The moist grain is conducted from the hopper 36 through a channel or passage 38 to the initial drying section 14. Opposite ends of the receiving section 12 are enclosed by parallel support walls 42 and 44 (see FIG. 1) which extend for substantially the entire length of the drier 10.

The walls 42 and 44 enclose opposite ends of the drying compartment 14 and 16 and the cooling compartment 18 in the same manner as they enclose opposite ends of the receiving section or compartment 12.

The initial or pre-heat section or compartment 14 is formed by a hexagonal inner wall 48 and a generally hexagonally shaped outer wall 50 which substantially surrounds the inner wall 48. The inner wall 48 and outer wall 50 include foramina or apertures 52 to enable hot air and other gases under pressure to be forced through the apertures 52 in the inner and outer walls 48 and 50. Grain retained intermediate the inner and outer walls 48 and 50 is dried by the hot air flowing through the grain and the inner and outer walls. The inner wall 48 and the two vertically extending support walls 42 and 44 define a plenum chamber 54 into which heated air is conducted by the duct 28 under pressure from the fan 22. The relatively high pressure heated air flows from the chamber 54 through the apertures 52 to dry the grain in the pre-heat section 14 by heating the grain and evaporating moisture from the grain. The air, laden with moisture from the grain, flows through the apertures 52 in the outer wall 50 to the atmosphere. After the grain has been partially dried in the initial heat section 14, it is conducted by channel or passage 56 to the final heat section or compartment 16.

The grain, when flowing from the initial heat section 14 to the final heat section 16, is intermixed or intermingled in the passage 56. This intermixing occurs because grain from the left side of the initial heat section 14 and grain from the right side of the initial heat section 14 flow together at a mouth 58 of the passage 56. The intermixing of the grain is extremely important, since it results in grain which is positoned adjacent to the inner wall 48 of the initial heat section 14 being intermixed with grain which is adjacent to the outer wall 50 of the initial heat section 14. The grain which was adjacent to the inner wall 48 generally has a lower moisture content, since the hot dry air from the plenum chamber 54 flows through the apertures 52 in the inner wall 48 and impinges on the grain adjacent to the inner wall. The air absorbs moisture from the inner layers of grain as it flows outwardly toward the outer wall 50. Since the air is relatively dry when it engages the inner layers of grain, the rate of moisture absorption from the inner layers is greater than the rate of moisture absorption from the outer layers of grain. By intermixing the inner and outer layers of grain in the passage 56, a relative displacement of the inner and outer layers of grain occurs and a relatively uniform moisture content is obtained in the grain after it has been dried in the final heat section 16. If the grain had not been intermixed when flowing from the initial heat section to the final heat section, the moisture content of the grain would not be as uniform as is required for many storage situations.

The final heat section 16 is formed by a hexagonal inner wall 62 and a generally hexagonal outer wall 64 which are interconnected at opposite end portions by the support walls 42 and 44. Both the inner and outer walls 62 and 64 are formed with foramina or apertures 66 to enable heated air to flow from a central plenum chamber 68 through the walls 62 and 64 to dry grain located between the inner and outer walls 62 and 64 of the final heat section 16. The plenum chamber 68 is applied with hot dry air under pressure by the duct 28 which is connected to the plenum chamber. The final heat section 16 is substantially the same as the structure of initial heat section 14 and has the same volumetric capacity as the initial heat section. Since the initial and final heat sections 14 and 16 have the same volumetric capacity, all of the grain which is partially heated in the initial heat section 14 can flow into the final heat section 16 in one step of the drying operation.

After the grain has been dried in the two heating sections 14 and 16, the grain flows through a channel or passage 70 to the cooling section 18. The flow of grain from the final heat section 16 to the cooling section 18 is regulated by a valve or gate 74 which is mounted in the passage 70. The valve or gate 74 is selectively opened to enable the grain to flow from the final heating section 16. The cooling section 18 has the same volumetric capacity as the final heating section 16 and initial heating section 14. Therefore, all the grain from the initial heating section 14 flows into the final heating section 16 as all the grain from the final heating section 16 flows into the cooling section 18. The cooling section 18 is formed in much the same manner as are the heating sections 14 and 16 and includes a hexagonal inner wall 76 and a generally hexagonal outer wall 78 having foramina or apertures 80 to enable relatively cool air to be drawn inwardly from the atmosphere to a central chamber 82 by the fan 22. As the air flows inwardly through the dried grain in the cooling section 18, a transfer of heat occurs between the relatively hot grain and the relatively cool air resulting in a heating of the air and a cooling of the grain. The air is then drawn by the fan 22 into the heater 24 where a further heating of the air occurs. The very hot air then flows into the ducts 26 and 28 and the plenum chambers 54 and 68. By cooling grain in the section 18 in the aforementioned manner, heat energy is reclaimed from the hot grain which is cooled for storage. This heat energy is utilized in drying other quantities of grain which are located in the heating sections 14 and 16. By utilizing this reclaimed heat, the efficiency of the drier 10 is greatly increased and the amount of heat which must be transferred to the air by the heater 24 is reduced.

When the grain is cooled in the section 18 to within approximately 20° of the atmospheric or ambient temperature, the grain absorbs moisture from any further air which is drawn through the grain in the cooling section 18. To prevent the cool dried grain from absorbing moisture, a door 85 is provided to enable air to be drawn from the cooling section by the fan 22 into the duct 28 and the heating sections 14 and 16 without drawing the air through the grain in the cooling section 18. The door 85 is moved from the closed position (illustrated in FIG. 2) to an open position by means of a hydraulic cylinder and valve system 86. The hydraulic system 86 is operated by a temperature differential control mechanism 87, which is of known construction. The temperature differential control mechanism is responsive to a temperature differential between the ambient air temperature and the temperature of the grain in the cooling section 18. When the differential between the ambient air temperature and the temperature of the grain in the cooling section 18 falls to approximately 20°, the temperature differential control mechanism 87 is actuated to close a switch and operate the hydraulic mechanism 86 to slide the door 85 to an open position. It should be noted that when the door 85 is open, the air which is drawn by the fan 22 into the heater 24 is not preheated by flowing through the grain between the walls 76 and 78 of the cooling section. However, due to the relatively small temperature differential (approximately 20°) between the ambient air temperature and the temperature of the grain in the cooling section 18, the heating action of the grain in the cooling section 18 would be relatively slight on any air drawn through the grain. Thus, when the door 85 is open, the efficiency of the grain drier 10 is impaired to only a slight extent since the grain within the cooling section 18 is almost the same temperature as the ambient air.

The cooling section 18 includes an outlet 90 through which grain flows into the hopper or container 20 from the cooling section 18. A valve or gate 92 is provided at the outlet 90 to regulate the flow of grain from the cooling section 18. When the hopper 20 has been filled with grain which has been dried and cooled to a safe storage temperature, and whose moisture content has been reduced below a predetermined level, the grain in the hopper is transported to a suitable storage location by a screw conveyor 21.

For purposes of affording a more complete understanding of the grain drier 10, it is advantageous now to provide a functional description of the mode in which the component parts thus far identified cooperate. The grain drier 10 is made up of four sections which are interconnected and will be full of grain when the drier 10 is in operation. When the drier 10 is being operated, the receiving section 12 will be full of relatively moist grain, the initial drying section 14 will be full of grain being partially dried, the final heating section 16 will be full of grain being dried to a predetermined moisture content, and the cooling section 18 will be full of dried grain being cooled for storage. After a complete step or cycle in the grain drying process, the dried and cooled grain will be emptied from the cooling section 18 by opening the gate 92 while the gate 74 is closed. All the dried and cooled grain will then flow from the cooling section 18 into the storage hopper 20.

The gate 92 will then be closed and the gate 74 opened. Heated dried grain will then flow from the final heat section 16 into the cooling section 18. As grain flows from the heating section 16 to the cooling section 18, the grain in the initial heating section 14 will flow into the final heating section 16 through the passage 56. Contemporaneously with the flow of grain from the initial heating section 14 to the final heating section 16, moist grain will flow from the receiving section 12 to the initial heating section 14. The heating sections 14 and 16 and cooling section 18 all have the same volumetric capacity so that a quantity of grain corresponding to the capacity of the heating and cooling sections will proceed in a step-like manner from the receiving section 12, to the initial heating section 14, to the final heating section 16, and then to the cooling section 18.

The grain in the final heating section 16 and initial heating section 14 will then be heated and dried by air drawn by the fan 22 from the chamber 82 through the heater 24 and blown into the duct 28 and plenum chambers 54 and 68. This high pressure hot dry air will flow outwardly through apertures or foramina in the walls of the heating and drying section and the grain located intermediate the walls. The efficiency of the drying operation will be increased by the reclamation of heat from the grain in the cooling sections by drawing air through the walls 76 and 78 and the hot grain located between these walls. The increased efficiency results from a preheating of the air while passing through the grain in the cooling section 18. This preheating substantially reduces the load on the heater 24 which further heats and dries the air before being blown into the plenum chambers 54 and 68.

The gate 74 is illustrated in greater detail in FIGS. 3 and 4. The gate 74 includes a plurality of interleaved fingers 100 and 102 which are integrally formed with opposite cylindrical body sections 104 and 106. When the body section 104 is pivoted clockwise, the fingers 100 are pivoted arcuately downwardly and outwardly relative to the fingers 102. Similarly, when the body section 106 is pivoted counterclockwise, the fingers 102 are pivoted downwardly and outwardly relative to the fingers 100. The two body sections 104 and 106 are pivoted by a linkage 108 (see FIG. 4) which includes a first link 110 connected to an outer end of the body section 104 and a second link 112 connected by a pivot arm 114 to an outer end of the body section 106. The linkage 108 coordinates the pivoting movement of the body sections 104 and 106, so that the fingers 100 and 102 are moved contemporaneously from the interleaved or closed relationship illustrated in FIGS. 3 and 4 to the spaced-apart or open relationship illustrated in FIG. 6. The linkage 108 is connected to a hydraulic actuator assembly 118 by a mounting block 120 which is fastened to an outer end of a pushrod 122. The pushrod 122 is in turn fastened to a piston 124 which slides in a cylinder 126. When the piston 124 is moved to the left end of the cylinder 126 (as illustrated in FIG. 4) the linkage 108 closes the gate 74. When the piston 124 is moved to the right end of the cylinder 126, the linkage 108 pivots the gate 74 to the open position illustrated in FIG. 6. The spaced-apart fingers 100 and 102 enable the gate sections to be moved with a minimum amount of effort through grain 130 in the channel or passage 70 between the final heat section 16 and the cooling section 18.

The gate 92 is formed of a solid plate 140 which extends across the outlet 90 of the cooling section 18. The plate 140 is connected to a body section 142 which is pivoted by a hydraulic actuator mechanism 144. The hydraulic actuator mechanism 144 is connected to the body section 142 by a link 146. The hydraulic actuator mechanism 144 is generally similar to the hydraulic actuator mechanism 118 and includes a cylinder 148 in which a piston 150 is slidably mounted. The piston 150 is connected by a pushrod 152 and mounting block 154 to the link 146. When the piston 150 is at the left end of the cylinder 148, as illustrated in FIG. 4, the gate 92 is closed. When the piston is at the right end of the cylinder 148, as illustrated in FIG. 5, the gate 92 is open.

The cylinder 126 of the hydraulic actuator mechanism 118, is connected by hydraulic lines 160 and 162 to a valve 164 which is actuated by a solenoid 166. The valve 164 is connected to a hydraulic fluid return line 168 and a high pressure line 170 which is connected to a hydraulic pump. In a similar manner, the cylinder 148 of the hydraulic actuator mechanism 144, is connected to a valve 172 by hydraulic lines 174 and 176. The valve 172 is actuated by an eletcric solenoid 178. The valve 172 is connected to the fluid return line 168 and to the hydraulic pump by a line 180. The solenoids 166 and 178 actuate the hydraulic valves 164 and 172 in a known manner to selectively connect the hydraulic lines 160, 162, 174, and 176 to the fluid pump or other source of pressure. When the solenoids are in their normal or unenergized state, the hydraulic lines or conduits 160 and 176 are connected to the source lines 170 and 180 to force the pistons to the left in the cylinders 126 and 148, as illustrated in FIG. 4. Thus, the gates 74 and 92 are normally retained in a closed position by the hydraulic actuator mechanisms 118 and 144. When the solenoids 166 and 170 are energized, the valves 164 and 172 are actuated to connect the lines 174 and 162 to the source lines 170 and 160 to open the gates 74 and 92 by forcing the pistons 124 and 150 toward the right under fluid pressure. The lines 160 and 176 are connected to the fluid return line 168 by energization of the solenoids to exhaust fluid from the cylinders 126 and 148 as the pistons 124 and 150 move to the right. The structural details of the hydraulic actuators 118 and 144 and the solenoid valves 164 and 172 is well known to those skilled in the art and need not be explained in greater detail at this time.

A control circuit 186 is connected to the two solenoids 166 and 178 to regulate the opening and closing of the gates 74 and 92 by the hydraulic actuator mechanisms 118 and 144. The control circuit 186 is a circuit of the parallel type having a first circuit leg for controlling the operation of the hydraulic actuator mechanism 118 and a second circuit leg for controlling the operation of the hydraulic actuator mechanism 144. The operation of the two hydraulic actuator mechanisms 118 and 144 is interlocked by means of switches 188 and 190 which are opened by an opening of the associated gate 74 or 92 and closed by a closing of the associated gate 74 or 92. The switch 188 is located in the circuit leg for energizing the solenoid 178 to prevent the gate 92 from being opened when the gate 74 is opened. Similarly, the switch 190 is in the circuit leg for energizing the solenoid 166 to prevent the gate 74 from being opened when the gate 92 is opened.

The control circuit 186 also includes a normally closed sensor or pressure responsive switch 192 which is located in the circuit leg for the solenoid 166. The switch 192 is opened by pressure from the grain in the cooling section 18 to prevent the gate 74 from being opened when a predetermined quantity of grain is present in the cooling section 18. A timer mechanism 194 is also included in the control circuit 186. The timer mechanism 194 is connected in the circuit leg for energizing the solenoid 178 to prevent the gate 92 from being opened before a predetermined cooling time for the grain in the section 18 and heating time for the grain in the sections 14 and 16 has elapsed. The timer 194 includes a time delay relay 196 which prevents the gate 92 from being closed before all of the dried grain in the cooling section 18 has had sufficient time to flow out of the section into the hopper or container 20 (see FIG. 2).

Turning now to a more detailed consideration of the control circuit 186, a battery or other source of power 200 is connected to a switch 202 for turning the circuit on and off (see FIG. 4). The switch 202 is connected by the leads 204 to the first circuit leg for controlling the operation of the hydraulic actuator mechanism 118. The lead 204 is in turn connected by leads 206 and 208 to the contacts 190. The contacts 190 are closed, when the gate 92 is closed, by the mounting block 154. When the gate 92 is open, as illustrated in FIG. 5, the contacts 190 are open. The contacts 190 are connected to the pressure switch 192 by the lead 210. The pressure switch 192 is in turn connected to the solenoid 166 by the lead 212. The solenoid 166 is connected to ground 214 through the leads 216 and 218 which are connected to a normally closed manual switch 220. Opening the normally closed manual switch 220 prevents the solenoid 166 from being energized to open the gate 74. A normally open manual switch 222 is connected by the leads 224 and 226 to the leads 206 and 212. The switch 222 enables the solenoid 166 to be selectively energized to open the gate 74. In view of the foregoing remarks, it will be apparent that the hydraulic actuator mechanism 118 will open the gate 74 when the gate 92 is closed to close the contacts 190, the normally open contacts of the pressure switch 192 are closed to indicate a level of grain in the cooling section 18 below a predetermined amount, and the normally closed manually operated contacts 220 are closed to complete a circuit from the battery 200 to the ground 214. If any one of these conditions is absent, the gate 74 can be opened only by closing the normally open manual switch 222.

The second leg of the control circuit 186, for regulating the opening and closing of the gate 92 by the hydraulic actuator mechanism 144, includes the timer mechanism 194. The timer mechanism 194 includes a control clock 230, of known construction, for closing contacts 232 at the end of a predetermined interval. The time interval is adjusted to vary the heating period for the grain in the sections 14 and 16 to provide a moisture content in the dried grain below a predetermined minimum content which is acceptable for storing the grain. The contacts 232 are connected by the leads 234 and 236 to the time delay relay 196. The time delay relay 196 is in turn connected to ground 214 by leads 238 and 218. The time delay relay 196 is also connected by a lead 240 to the contacts 188 associated with the hydraulic actuator mechanism 118. The contacts 188 are closed, by the mounting block 120, when the gate 74 is closed (see FIG. 4) and are opened when the gate 74 is opened (see FIG. 6). The contacts 188 are connected to the solenoid 178 by the lead 242. The solenoid 178 is in turn connected by a normally closed manual switch 244 and leads 246, 248, 206, and 204 to the battery or other source of power 200. The normally closed switch 244 enables the solenoid 178 to be selectively manually retained in a de-energized state by opening the switch 244. A normally open manual switch 250 is connected to the lead 242 by a lead 252. The switch 250 is also connected to ground 214 over leads 218 and 254. The manual switch 250 enables the solenoid 178 to be selectively retained in an energized condition by closing the normally open switch 250.

In view of the foregoing remarks, it is apparent that the solenoid 178 for controlling the operation of the hydraulic actuator mechanism 144 is energized through a circuit including the contacts 188 which are closed when the gate 74 is closed, the timer mechanism 194 which closes contacts 232 at the end of a predetermined drying time interval when the grain has thoroughly dried, and a time delay relay 196 which prevents the gate 92 from closing before the grain in the cooling section 18 has had sufficient time to flow into the hopper or container 20. Thus, the solenoid 178 can be energized to open the gate 92 only at predetermined intervals, as determined by the clock mechanism 230, when the gate 74 is closed. If the gate 74 is open or the predetermined time interval has not elapsed, the gate 92 can be opened only by closing the normally open switch 250.

Referring now to FIG. 2, the operation of the grain drier 10 is started manually by placing an initial quantity or batch of grain in the receiving section or compartment 12. This initial quantity of grain is equal in volume to the capacity of the heating or drying sections 14 and 16. The initial quantity of grain, since the drier 10 is empty at the start of a drying operation, flows through the channel or passage 38, through the initial or preheat section 14 and into the final heat section 16. The gate or valve 74 is closed to retain the initial quantity of grain in the final heat section 16. As shown in FIG. 4, the contacts of the pressure sensitive switch 192 will be closed, since the cooling section 18 is empty. However, the gate 74 is prevented from opening by actuating the normally open manual switch 220 to prevent the solenoid 166 from being energized to actuate the valve 164 and the hydraulic actuator mechanism 118 to open the gate 74. Although the gate 74 can be effectively locked in the closed position by retaining the gate 92 in an open position so that the contacts 190 are open, this requires the contacts 232 of the timer 194 to be kept closed and prevents the timer from being used to time the heating cycle for the initial quantity of grain.

As is best seen in FIGS. 1 and 2, during the starting cycle a door 264 is moved downwardly on the front of the drier on tracks 266, from the position shown in FIG. 1, to block the flow of hot dry air from the duct 28 into the plenum chamber 54. The door 264 is closed during an initial phase of a starting cycle for the drier when the heating section 14 is empty, to route the hot dry air into the plenum chamber 68 for the final heat section 16. The heater 24 is then started and the initial quantity of grain is dried in the heating section 16 for a predetermined drying period. The timer 194 can advantageously be utilized to indicate when the predetermined drying period has elapsed. After the predetermined drying period has elapsed, a second batch or quantity of grain is placed into the initial drying section 14 and the door 264 is moved to the open position shown in FIG. 1. It should be noted that if only a single small batch of grain is to be dried, the door 264 would remain closed while the following steps take place. The heater 24 is then recycled for a second drying period, which can also be timed with the timer unit 194. The initial batch or quantity of grain in the final drying section 16 will then have received two complete heating or drying cycles and will have a moisture content below a predetermined maximum level. Therefore, the initial quantity or batch of grain in the final heating section 16 is ready to be cooled.

The initial quantity or batch of grain is moved from the final heating section 16 to the cooling section 18 by opening the gate 74. Since the cooling section 16 is empty, the contacts in the pressure switch 192 are closed (see FIG. 4). The contacts 190, associated with the actuator mechanism 144, are also closed, since the gate 92 is closed. Therefore, it is merely necessary to close the manually actuated switch 220 to open the gate 74 and permit the initial quantity or batch of grain to flow from the final drying section 16 into the cooling section 18. As the initial quantity of grain flows into the cooling section 18, the second batch or quantity of grain flows from the initial heating section 14, where it has been partially dried during one heating cycle or time period, into the final heating section 16. As the second quantity of grain flows from the initial heating section 14 into the final heating section 16, the grain is intermixed in the channel or passage 56 to provide a uniform drying of the grain. It is apparent that, as the second quantity of grain flows from the initial drying section to the final drying section, moist grain flows from the receiving section 12 through the channel or passage 38 to the initial drying section 14.

The level of grain in the cooling section 18 gradually rises as the initial quantity of grain flows from the final heating section 16 to the cooling section 18. When all of the initial quantity of grain has flowed from the final heating section to the cooling section, the contacts in the pressure sensitive switch 192 are closed by the heated and dried grain to de-energize the solenoid 166 and close the gate 74. The grain drier 10 is now ready to begin automatic operation wherein the grain is dried in heating cycles which are repeated at predetermined intervals under the control of the time clock 230 of the timer 94.

The grain in the initial heating section 14 and final heating section 16 is heated by hot dry air which has been drawn through the dried grain in the cooling section 18 and the heater 24 by the fan 22. As the air is drawn through the grain in the cooling section 18, the hot dry grain in the cooling section is cooled to a safe storage temperature, and the grain in the final heating section 16 is dried to have a uniform moisture content below a predetermined level. Of course, the time period for which the grain is dried in the heating sections 14 and 16 is determined by the moisture level which is desired in the dried grain. That is, the lower the moisture content, the longer the drying period, and conversely, the higher the moisture content of the dried grain, the shorter the drying period.

When the drying and cooling period has elapsed, the contacts 232 of the timer 194 close for a brief period to complete a circuit through the contacts 188 associated with the closed gate 74 and energize the solenoid 178 to operate the hydraulic actuator mechanism 144. The actuator mechanism 144 opens the gate 92 (see FIGS. 4 and 5) and dumps the dried and cooled grain from the cooling seciton 18 into the hopper or container 20. It should be noted that the interlock provided by the contacts 188 and 190 associated with the hydraulic actuator mechanism 118 and 144 is position responsive to secure the gate 92 from being opened if the gate 74 is open. Thus, the gate 92 can be opened only if the gate 74 is closed to block the flow of hot dry grain from the final heating section 16 into the cooling section 18 to prevent the hot dry grain from being intermixed with the cooled grain and flowing into the container or hopper 20. The gate 92 is held in an open position by the time delay relay 196 for a time period which is sufficient to enable all of the cooled grain to flow from the cooling section 18, even though the contacts 232 of the timer are closed shortly after they are opened by the clock 230.

When the cooled and dried grain from the cooling section 18 has been emptied into the hopper 20 and the contacts in the time delay relay have opened, the solenoid 178 is deenergized to close the gate 92. Once the gate 92 has closed, the solenoid 166 is energized to open the gate 74 (see FIGS. 4 and 6). The solenoid 166 is energized by a closing of the contacts 190 due to the closing of the gate 92 and a closing of the contacts of the pressure sensitive switch 192 due to the emptying of the grain from the cooling section 18. The hot dry grain then flows through the open gate 74 into the cooling section 18 until the level of grain is sufficient to press open the contacts of the pressure sensitive switch 192. When the contacts of the pressure sensitive switch 192 are opened, the solenoid 166 is de-energized and the hydraulic actuator mechanism 118 is operated to close the gate 74. It should be noted that the gate 74 has fingers 100 and 102 which can swing through the hot dry grain in the cooling chamber 18 with a minimum amount of resistance. Of course, as the hot dry grain flows from the final heating section 16 into the cooling section 18, the partially dried grain in the initial heating section 14 flows into the final heating section 16 and moist grain from the receiving section 12 flows into the initial heating section 14. Since the heating sections 14 and 16 and cooling section 18 all have the same capacity, all of the hot dried grain flows into the cooling section 18 from the final heating section 16 and all of the partially dried grain flows from the initial heating section 14 into the final heating section 16 in a step-like fashion. The heating and cooling cycle is then repeated to dry the grain in the heating sections 14 and 16 and cool the grain in the cooling section 18.

The operation of the drier 10, constructed as illustrated in FIGS. 1 through 6, will be largely apparent from the foregoing description. However, the operation may be briefly summarized as follows: Moist grain is placed in the drier 10 at a receiving section 12. As the drier is operated, the moist grain will flow from the receiving section 12 into the initial drying section 14 where it is preheated and partially dried. The grain will then flow from the initial heating section 14 to the final heating section 16 wherein the drying process is continued until the grain has a uniform predetermined moisture content. It should be noted that as the grain flows from the initial drying section 14 into the final drying section 16, the grain is intermixed or intermingled in the passage 56 to provide a uniform drying action in the two drying sections 14 and 16. If the grain was not intermixed in the passage 56, the grain closest to the plenum chamber 68 would have a relatively low moisture content while the grain farthest from the plenum chamber (i.e., adjacent the outer wall 64) would have the highest moisture content.

After the grain has been dried, it will flow into a cooling section 18 where it can be cooled to a safe temperature for storage. The grain will be cooled in the cooling section 18 by flowing air through the inner and outer walls 76 and 78, and the hot grain located intermediate these walls, into the chamber 82. Heat will be transferred to the air as it flows through the hot grain to preheat the air before it is drawn into the heater 24 by the fan or pneumatic unit 22. Thus, the drying heat will be partially reclaimed from the grain to increase the operating efficiency of the drier 10. The heated air will then be blown by the fan 22 into the plenum chambers 54 and 68 to heat and dry the grain in the heating sections 14 and 16.

The step-like movement of the grain, from the receiving section to the initial heating section, to the final heating section, and to the cooling section, will be controlled by a pair of gates 74 and 92. The gates 74 and 92 are interlocked, by a position responsive circuit, so that only one gate can be open at any one time to prevent an accidental discharge of the grain from the drier 10 before the grain has been cooled in the cooling section 18 and dried in the drying sections 14 and 16. A sensor unit, in the form of the pressure sensitive switch 192, is provided for opening the gate 74 when the cooling section 18 is emptied of grain and the gate 92 is closed. Also, a timer unit 194 is provided to sequentially cycle the drier 10 at predetermined time intervals and to hold the gate 92 in an open position for a sufficient time interval to empty the cooling section 18.

The preferred embodiment of the grain drier illustrated herein is to be considered as being primarily illustrative. It is contemplated that the grain drier 10 can be modified in many ways and still accomplish its intended purpose. For example, the time clock 230 can be replaced with a moisture sensitive switch structure, of known construction, to cycle the grain drier when the moisture content of the grain in the drying sections 14 and 16 falls below a predetermined level. Various changes in the gate structure and hydraulic actuator mechanism will, no doubt, occur to those skilled in the art. In addition to changing the gates and hydraulic actuator mechanisms, it is apparent that the pressure sensitive switch could, if desired, be replaced with a weight or gravity responsive switch structure. It is contemplated that the drier 10 could be used for the drying of granular material other than grain, and it is to be understood that grain is used as a generic term in both the specification and claims to describe any granular or nodular material requiring drying. Various other changes in structure, beyond those described, will occur to those skilled in the art; and such changes are to be understood as forming a part of this invention insofar as they fall within the spirit and scope of the appended claims.

What is claimed is:

1. A structure for drying grain comprising: a first section for heating and drying grain; a second section connected to said first second for cooling grain heated and dried in said first section; first valve means mounted between said first and second sections for controlling the flow of grain from said first section to said second section; container means positioned adjacent an outlet from said second section for receiving cooled grain from said second section, second valve means mounted adjacent the outlet from said second section to control the flow of grain from said second section to said container means, whereby grain is heated and dried in said first section and cooled in said second section before flowing into said container means, and electrical circuit means for automatically controlling the sequential, timed, opening and closing of said valve means.

2. A structure for drying grain as set forth in claim 1 wherein temperature differential control means is provided which is responsive to a temperature differential between the ambient air temperature and the temperature of the grain in the cooling section.

3. A structure for drying grain comprising: a first section for heating and drying grain; a second section connected to said first section for cooling grain heated and dried in said first section; first valve means mounted between said first and second sections for controlling the flow of grain from said first section to said second section; container means positioned adjacent an outlet from said second section for receiving cooled grain from said second section; second valve means mounted adjacent the outlet from said second section to control the flow of grain from said second section to said container means, whereby grain is heated and dried in said first section and cooled in said second section before flowing into said container means; said first valve means being movable between an open position enabling grain to flow from said first section to said second section and a closed position blocking the flow of grain from said first section to said second section; said second valve means being movable between an open position enabling grain to flow from said second section to said container means and a closed position blocking the flow of grain from said second section to said container means; and position responsive means mounted adjacent said first and second valve means, said position responsive means being actuated by the presence of said first valve means in the open position to lock said second valve means in the closed position, said position responsive means being actuated by the presence of said second valve means in the open position to lock said first valve means in the closed position.

4. A structure for drying grain comprising: a first section for heating and drying grain; a second section connected to said first section for cooling grain heated and dried in said first section; first valve means mounted between said first and second sections for controlling the flow of grain from said first section to said second section; container means positioned adjacent an outlet from said second section for receiving cooled grain from said second section; second valve means mounted adjacent the outlet from said second section to control the flow of grain from said second section to said container means, whereby grain is heated and dried in said first section and cooled in said second section before flowing into said container means; further including first actuator means connected to said first valve means for selectively moving said first valve means from a closed position blocking the flow of grain from said first section to said second section to an open position enabling grain to flow from said first section to said second section; second actuator means connected to said second valve means for selectively moving said second valve means from a closed position blocking the flow of grain from said second section to said container means to an open position enabling grain to flow from said second section to said container means; and control circuit means connected to said first and second actuator means to enable said first valve means to be moved from the closed position to the open position only when said second valve means is in the closed position and to enable said second valve means to be moved from the closed position to the open position only when said first valve means is in the closed position.

5. A system as set forth in claim 4 wherein: said control circuit means includes timer means for preventing said second valve means from moving from the open position to the closed position until a predetermined time period has elapsed, the predetermined time period being of sufficient duration to enable all the grain in said second section to flow from said second section to said container means before said second valve means is moved to said closed position.

6. A system as set forth in claim 4 wherein: said control circuit means includes adjustable timer means for regulating the duration of a cycle of heating the grain in said first section and cooling the grain in said second section, said timer means preventing said second valve means for being moved from the closed position to the open position before the cycle of heating the grain in said first section and cooling the grain in said second section has elapsed.

7. A system as set forth in claim 4 wherein: said control circuit means includes pressure responsive switch means to prevent said first valve means from moving from the closed position to the open position when said second section is full of grain.

8. An assembly for drying grain comprising: a structure having a first compartment for heating and removing moisture from the grain and a second compartment for cooling the grain heated in said first compartment; passage means for conducting gas from said second compartment to said first compartment; heater means associated with said passage means for heating gas flowing through said passage means; fan means connected to said passage means for inducing a flow of gas through the grain in said second compartment, through said heater means, and then through the grain in said first compartment to heat and dry the grain in said first compartment while cooling the grain in said second compartment; first gate means mounted intermediate said first and second compartments to control movement of grain from said first compartment to said second compartment, said first gate means including first actuator means for moving said first gate means from an open position wherein grain can move from said first compartment to said second compartment to a closed position wherein grain is blocked by said first gate means against movement from said first compartment to said second compartment; second gate means mounted adjacent to an outlet from said second compartment to control movement of grain from said second compartment, said second gate means including second actuator means for moving said second gate means from an open position wherein grain can move from said second compartment to a closed position wherein grain is blocked by said second gate means against movement from said second compartment; and circuit means interconnecting said first and second actuator means for controlling movement of said first and second gate means, said circuit means interlocking said first and second actuator means to enable said first actuator means to move said first gate means from the closed position to the open position only when said second gate means is in the closed position and to enable said second actuator means to move said second gate means from the closed position to the open position only when said first gate means is in the closed position, whereby the grain is heated and dried in said first compartment and moved in a predetermined sequence to said second compartment for cooling.

9. An assembly as set forth in claim 8 wherein: said circuit means includes: timer means for enabling said second gate means to be moved from said closed position to said open position only after grain has been heated in said first compartment and cooled in said second compartment for a predetermined time period; and time delay means for locking said second actuator means against moving said second gate from the open position to the closed position for a predetermined time period to enable all of the grain to move from said second compartment after the grain has been cooled.

10. An assembly as set forth in claim 8 further including: a third compartment connected to said passage means for preheating the grain with heated gas from said passage means; and an interconnecting passage extending between said first and third compartments in which the grain is intermixed for moving from said third compartment to said first compartment to provide a uniform drying of the grain.

11. An assembly as set forth in claim 9 wherein said circuit means further includes: sensor means connected to said first actuator means and associated with said second compartment to enable said first actuator means to move said first gate means from the closed position to the open position only when said sensor means indicates that the quantity of grain in said second compartment is below a predetermined level.

12. An assembly as set forth in claim 11 wherein said circuit further includes: manually actuatable switch means for overriding said sensor means, said time delay means, said timer means, and the interlock between said first and second actuator means to enable said first and second gate means to be selectively opened and closed with any level of grain in said second compartment, at any time for any length of time, and in any desired sequence.

References Cited

UNITED STATES PATENTS

| | | | |
|---|---|---|---|
| 2,626,066 | 1/1953 | Rasmussen | 222—445 XR |
| 2,642,206 | 6/1953 | Reed | 222—504 XR |
| 2,723,057 | 11/1955 | Golden | 222—442 |
| 923,137 | 6/1909 | Cass | 34—174 XR |
| 1,127,974 | 2/1915 | Ellis | 34—174 XR |
| 1,151,268 | 8/1915 | Hess | 34—174 XR |
| 1,239,216 | 9/1917 | Randolph | 34—174 |
| 2,644,587 | 7/1953 | Webster | 34—174 XR |

FREDERICK L. MATTESON, JR., *Primary Examiner.*

A. D. HERRMANN, *Assistant Examiner.*